Figure 2:
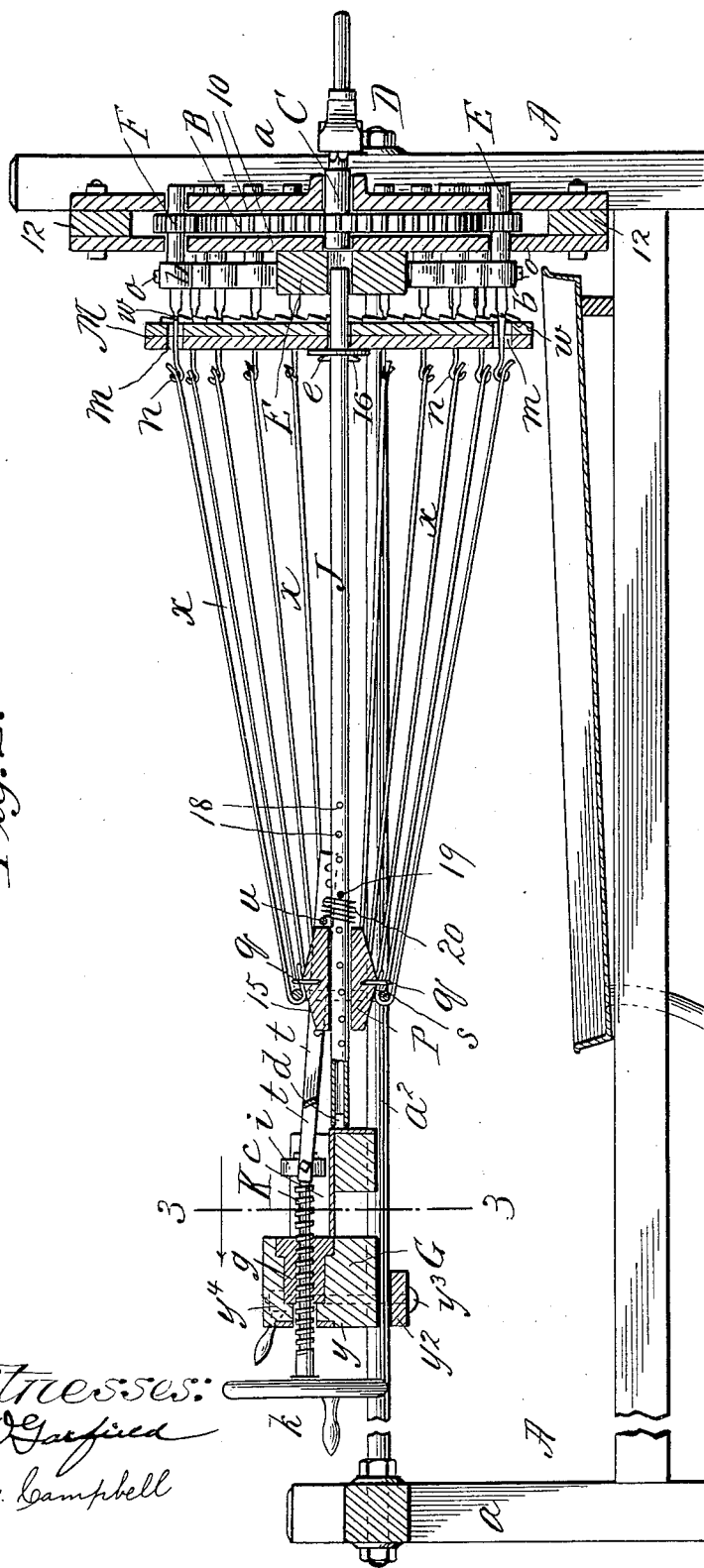

No. 633,433. Patented Sept. 19, 1899.
J. P. DONOVAN.
MACHINE FOR TWISTING AND STRETCHING RAWHIDE WHIP CENTERS.
(Application filed May 29, 1899.)
(No Model.) 3 Sheets—Sheet 1.

Fig. 1.

Witnesses:
J. W. Garfield
M. A. Campbell

Inventor
John P. Donovan
by Wm. S. Bellow
Attorney.

No. 633,433. Patented Sept. 19, 1899.
J. P. DONOVAN.
MACHINE FOR TWISTING AND STRETCHING RAWHIDE WHIP CENTERS.
(Application filed May 29, 1899.)
(No Model.) 3 Sheets—Sheet 2.

Witnesses:
J. W. Garfield
M. A. Campbell

Inventor
John P. Donovan,
by Wm. S. Bellows,
Attorney.

No. 633,433. Patented Sept. 19, 1899.
J. P. DONOVAN.
MACHINE FOR TWISTING AND STRETCHING RAWHIDE WHIP CENTERS.
(Application filed May 29, 1899.)
(No Model.) 3 Sheets—Sheet 3.

Witnesses:
J. D. Garfield
M. A. Campbell

Inventor
John P. Donovan
by Wm. T. Bellows
Attorney

UNITED STATES PATENT OFFICE.

JOHN P. DONOVAN, OF WESTFIELD, MASSACHUSETTS.

MACHINE FOR TWISTING AND STRETCHING RAWHIDE WHIP-CENTERS.

SPECIFICATION forming part of Letters Patent No. 633,433, dated September 19, 1899.

Application filed May 29, 1899. Serial No. 718,629. (No model.)

*To all whom it may concern:*

Be it known that I, JOHN P. DONOVAN, a citizen of the United States of America, and a resident of Westfield, in the county of Hampden and State of Massachusetts, have invented certain new and useful Improvements in Machines for Twisting Rawhide Whip-Centers, of which the following is a full, clear, and exact description.

This invention relates to improvements in a machine or apparatus for twisting rawhide whip-centers while in a wet or moist state, maintaining such strips in the twisted condition until they shall have become dry and set and without tendency to untwist.

The object of the invention is to provide a machine which is convenient and practical and efficient and satisfactory for twisting the rawhide strips.

The object of the invention is, furthermore, to provide a machine of the character indicated which is capable of convenient and expeditious use and permits the employment therein or in conjunction therewith of removable appliances on which pluralities or series of the strips of rawhide are supported and twisted, so that these appliances may be interchanged successively in carrying forward the rapid performance of the work without the necessity of waiting for the strips which have been twisted to become dried and set.

The invention consists, primarily, in a machine comprising opposite end supports for connection therewith of the strips of rawhide to be twisted, one end support at which the rawhide is connected being rotatable, while the other end support is non-rotatable, and means for rotating the supports at one end.

The invention furthermore consists in a machine comprising opposite end supports for connection therewith of the strips of rawhide to be twisted, one end support being rotatable, while the other is non-rotatable, one of the end supports being endwise movable toward and away from the other, means for imparting the endwise movement of the one support in relation to the other end support for placing the rawhide in proper tension while being twisted, and means for rotating each of the supports for the rawhide strips at one end of the machine for twisting such strips.

The invention furthermore consists in opposite supports for series of the strips of rawhide and with which the latter are to be engaged, those at the one end being individually rotatable and supported on or carried by a part in common to the other end support and removable bodily from the machine proper, which machine proper comprises the means for rotating the individual supports or hooks for the rawhide at one end of each thereof and the means for imparting the endwise draft movement to one of the end supports of the series of rawhide strips, so that the strips after having been twisted and tensioned may, while remaining on the supports on which they were twisted, be bodily removed from the machine, leaving the same in readiness for the reception of similar appliances on which a new series of the rawhide strips may be mounted and twisted as before; and the invention furthermore consists in the constructions and combinations of parts, all substantially as hereinafter fully described, and set forth in the claims.

Reference is to be had to the accompanying drawings, in which—

Figure 3:
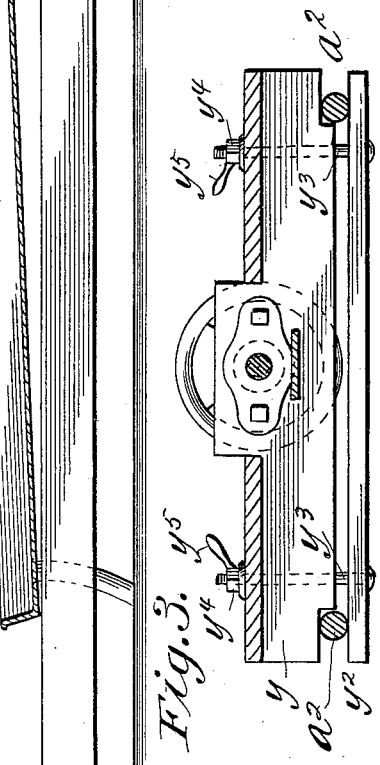
Figure 4:
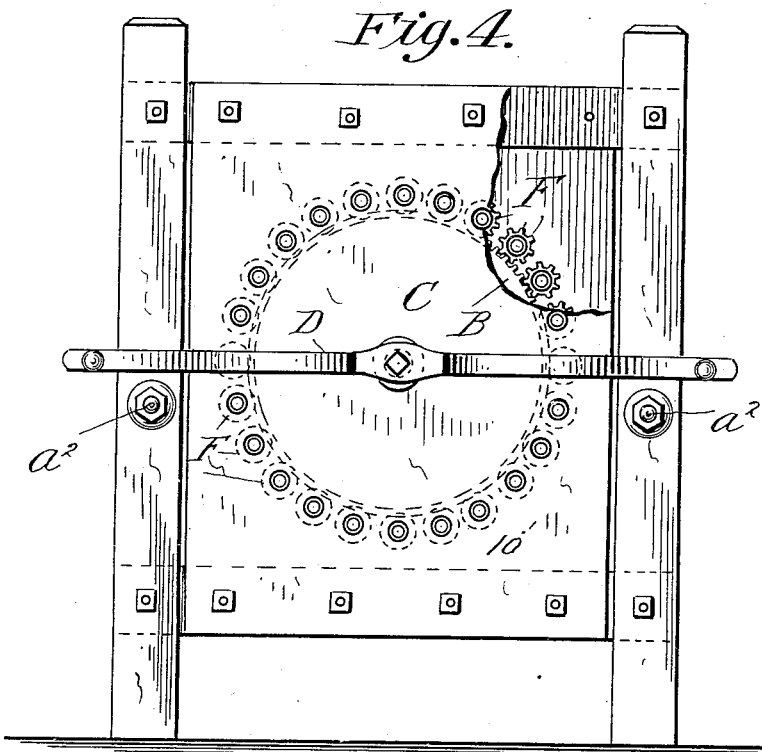
Figure 5:
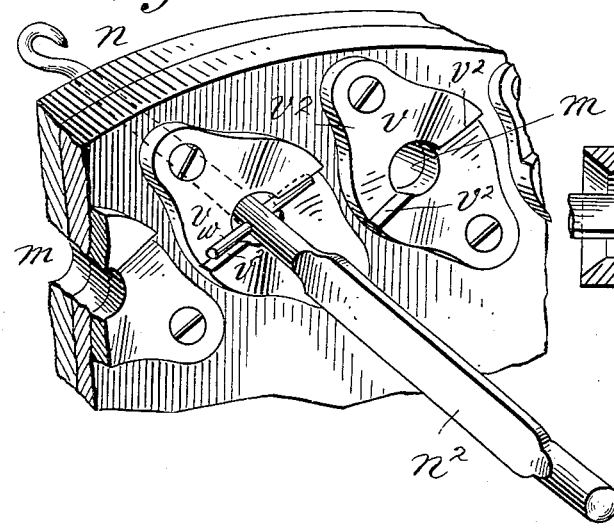
Figure 6:
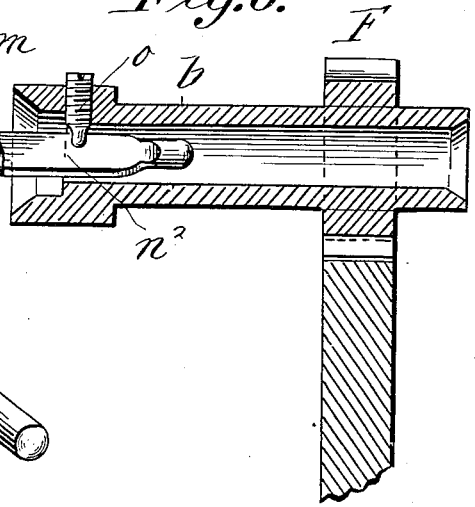

Figure 1 is a plan view of my improved machine. Fig. 2 is substantially a central longitudinal vertical section of the same. Fig. 3 is a vertical cross-sectional view of a portion of the machine as taken on the line 3 3, Fig. 2. Fig. 4 is an elevation of the right-hand end of the machine with a part broken away for a clearer illustration. Fig. 5 is a perspective view of a part of the supporting-head for the individual rawhide engaging and supporting hooks, showing more particularly the combination of one of such rotatable hooks with a ratchet or detent device therefor which serves to prevent the untwisting. Fig. 6 is a sectional view, on a larger scale, showing the manner of detachable engagement of one of the twister-hooks with the gear-wheel which imparts thereto its rotary twisting motion.

Similar characters of reference indicate corresponding parts in all of the views.

In the drawings, A represents the framework of the machine, the same comprising upright ends $a$ $a$ and the opposite horizontal lengthwise extending bars or rails $a^2$ $a^2$.

At the upright head end of the machine is journaled a spur-gear B, mounted on the suitably-journaled short horizontal shaft C, for which is provided the double-lever handle D. Also journaled in the upright head end of the machine are the concentrically-arranged series of spur gear-wheels F F in mesh with and driven by the large gear-wheel B. Each of these pinion gear-wheels F is provided with an elongated hollow hub $b$, as more particularly seen in Fig. 6.

As shown in Fig. 2, the right-hand head end of the machine is constructed in the form of a casing for the gear-wheels and also is adapted to constitute the journal-bearings therefor, the said upright end of the machine being made with the outer and inner plates or walls 10 10, separated by the spacing blocks or bars 12 and bolted together, the ends of the tubular hubs $b$ of the pinion gear-wheels being extended inwardly beyond and to the exterior of the said gear-supporting head of the machine. Said gear-supporting head is at its inner face provided with the centrally-apertured journal hub or support E, axially coincident with the journal of the large central gear.

Near the opposite end of the machine from the aforesaid head end is a horizontal normally-stationary rest or support G, which, however, is endwise adjustable, as and for the purpose hereinafter explained.

At the inner edge or end of the support G is a bearing-stud or other suitable support $d$ for the left-hand end of the tubular shaft J, the opposite end of which shaft is entered within the central socket $f$ therefor in the portion E at the inner face of the upright head of the machine. The said rest is formed centrally apertured, as indicated at $c$, and through the bushing or portion $g$ of the stationary support G is arranged the horizontal longitudinal screw-shaft K, having at its left-hand end the hand-wheel $k$ and having at its right-hand end the collar $i$, understood as loose thereon, but engaged therewith to move endwise with the screw-shaft as the same is turned. The tubular shaft J, which is mounted axially coincident with the center of the gear-wheel B, being removably supported at one end in the socket $f$ and at the other end on the support-stud $d$ of the rest G, has thereon at the right-hand end near the inner face of the gear-casing the centrally-apertured circular board or disk M, which is provided in addition to its central aperture $e$, through which the shaft J has its end portion passed, with the circular series of holes $m$, coincident with the axes of the pinion-wheels F, and through which holes the twister-hooks $n$ are extended, the shanks of these hooks being entered within the tubular hubs of the pinion gear-wheels F and engaged at the flattened sides $n^2$ thereof by the inwardly-extended ends of the screws $o$, which pass with a thread engagement transversely through the hubs $b$ of the pinions. There is provided upon the left-hand end portion of the tubular shaft J the sliding collar P, endwise tapered, as indicated at 15. This collar is provided with the radial series of pins or spurs $q$, corresponding in number to the hooks $n$ and to the number of strips of rawhide to be stretched and twisted in the machine at one time.

$s$ indicates a retaining-ring to be crowded on the conical collar P toward the spurs $q$.

The tubular shaft J has near its right-hand end the shoulder pin or collar 16 for preventing the apertured disk M from being unduly moved along the shaft toward the left. The said shaft J is also near its left-hand end provided with several closely-arranged transverse perforations 18, through one of which a limiting-pin 19 is passed, and between the outwardly-protruding ends of this pin and the adjacent end of the collar a spiral spring 20 is applied, the reaction of which is against the collar to exert a forcing leftward pressure thereon.

$t\,t$ represent straps having connection at their one end with the aforesaid collar $i$, carried by the screw-shaft K, and having engagements at their other end with the cross-bar or stiff rod $u$, transversely arranged and lying against the right-hand end of the collar P.

In the utilization of this machine the strips of wet rawhide $x$, which in practice may be six or seven feet long, have their left-hand ends engaged with the spurs or pins $q$ of the collar P, and the retaining and binding ring $s$ is then slid up over the strips toward the spurs, binding said strips with a tight pressure against the collar. The strips $x$ are then returned rightward and have their right-hand extremities, which are usually slitted or perforated, engaged with the hooks $n$, the collar P being forced by hand as far as practicable to the left and the retaining-pin 19 engaged through the proper cross perforation of the tubular shaft. The cross rod or bar $u$, engaged with the collar P, is also engaged with the straps or draft-bars $t$, and the screw-shaft K is now turned sufficiently to place the desired tension on the series of strips. The lever-handle D is now turned, rotating the gear-wheel B and all the pinions in the same direction, imparting the twist to the rawhide strips individually. It is usually desirable after the strips have been considerably twisted subsequent to having been placed in tension to further endwise draw them by again rotating the screw-shaft, and then a still further twisting motion is imparted to the hooks through the gearing with which the hooks are engaged. It will be pointed out that the disk M, through the apertures $m$ of which the shanks of the hooks are passed, has a series of ratcheted plates $v$, with the ratchet-teeth $v^2$, with which teeth the cross-pins $w$, which are provided for the shanks of the hooks, have clicking engagements as they are turned, and these engagements of the cross-pins with the ratchet-teeth are such as to prevent untwisting rotation of the hooks. After the tensioning and twisting operations have been performed the straps $t$ may be disconnected from their engagements through means of the cross-rod $u$, with the collar, which constitutes the one end support for the strips, and the tubular shaft may be bodily removed from the machine, carrying with it intact the collar P and the disk M, together with the entire series of hooks $n$ and all of the stretched and twisted strips, which may be set away to dry. The said parts P and M are held against being moved along the shaft J toward each other by the stops 16 and 19, and upon the removal of one of the shafts J, with the collar P, disk M, and the hooks $n$ and the stretched and twisted rawhide, the machine is left in readiness for the reception therein of a next tubular shaft with collar P, disk M, and series of the twister-hooks $m$, it being understood that these hooks, arranged through the holes in the disk, may be readily introduced at their shank ends endwise into the hollow hubs of the pinion-gears and to engagement with the inwardly-protruding ends of the screw-pin $o$, which insure by lying against the flattened sides of the twister-hook shank that the latter will be rotated in unison with the pinion-gears.

In order that the machine may be readily adapted for twisting strips of rawhide for whip-centers of different lengths, the rest or support G is bodily endwise adjustable by being formed with upper and lower portions $y$ and $y^2$, as more particularly seen in Figs. 2 and 3, which portions embrace the longitudinal support-bars $a^2$ and are when properly adjusted held in confinement thereon by the clamping-bolts $y^3$, for which are provided the nuts $y^4$, having the lever-handles $y^5$.

While I have described my present improved machine, in respect of the details of its construction, somewhat minutely, I desire to state that I may depart from such details without departing from the essentials and primary characteristics of my invention.

Having thus described my invention, what I claim, and desire to secure by Letters Patent, is—

1. In a machine for twisting rawhide strips, supports arranged at or near opposite ends of the machine, and adapted for the connection therewith of the strips to be twisted, one end support for each strip being rotatable while the other end support is non-rotatable and means for turning the rotatable support.

2. In a machine for twisting rawhide strips, supports arranged at or near opposite ends of the machine, adapted for the connection therewith of the strips to be twisted, one end support being rotatable while the other is non-rotatable, one of the end supports being endwise movable in relation to the other, means for imparting the endwise movements of the one end support for placing the rawhide in proper tension while being twisted, and means for turning the rotatable support for the rawhide.

3. A machine for twisting rawhide centers which consists of opposite supports for the strips of rawhide, and with which the latter are to be engaged, those at the one end being individually rotatable and supported on, or carried by a part in common to the other end support, and removable bodily from the machine proper which machine proper comprises the means for rotating the individual supports or hooks for the rawhide at one end of each thereof, and the means for imparting the endwise draft movement to one of the end supports of the series of rawhide strips, so that the strips after having been twisted and tensioned may, while remaining on the supports on which they were twisted, be bodily removed from the machine, leaving the same in readiness for the reception of similar appliances on which a new series of the rawhide strips may be mounted and twisted as before.

4. In a machine for twisting rawhide whip-centers, in combination, the series of rotatable gear-wheels F, the hooks or like supports for the opposite ends of the rawhide strips, rotated by said gear-wheels, the gear-wheel B meshing said gear-wheels F, means for turning said gear B, the part P located at or near the opposite end of the machine from said gear-driven hooks, a support on which it is movable toward and away from said hooks, and means for imparting a tensioning or draft movement to the said part P in a direction away from the hooks.

5. In a machine for twisting rawhide whip-centers, in combination, the removably-supported shaft J, the part P endwise movable along said shaft, and means for confining the end of the strips thereon, the apertured disk M, means for limiting said disk and part P against approaching movements, a series of rotatable gear-wheels F, the hooks or like supports for the ends of the rawhide detachably engaged with and rotated by said gear-wheels, and protruding through the apertured disk, the gear-wheel B meshing said gear-wheels F, and means for turning said gear B, ratchet devices on the disk with which projections which are on the hooks, engage, and means for imparting a tensioning movement to the said part P, substantially as and for the purposes set forth.

6. In a rawhide-twisting machine, the combination with the rotary hooks, of the shaft J, the collar P mounted on and endwise movable along said shaft, and formed conical, provided with the radial spurs and the binding-ring, means for rotating the hooks individually, and means for imparting a draft movement to said collar P along the shaft in a direction away from the said hooks, substantially as and for the purposes set forth.

7. In a rawhide-twisting machine, the combination with the rotary pinion-gears having tubular hubs, of the hooks having their ends removably entered in said tubular hubs and non-rotatably engaged therein, of the shaft J removably supported provided with the sliding collar P having means for the connection of the ends of the strips thereon, the apertured disk M mounted on said shaft, through the apertures of which the hooks protrude, and means for turning the hooks, means for imparting an endwise tensioning movement to the said collar P, and the ratchets on said disk with which the projections on the hooks engage, for the purposes described.

8. In a rawhide-twisting machine, the combination with the series of rotatable hooks in circular arrangement at one end of the machine, and means for imparting rotary movements individually thereto, of the shaft J arranged longitudinally and concentrically relatively to said circular series of hooks, the collar P mounted and endwise movable along said shaft and having a series of members for the engagement therewith of the ends of the rawhide strips, and the screw-shaft K having a draft connection with the said collar for the purpose set forth.

9. In a machine for twisting rawhide whip-centers, the combination with the gear B, and means for rotating it, and series of pinions F having tubular hubs, the support G having the support-stud $d$ and screw-shaft K, and the bearing-support E, with socket $f$, the shaft J removably supported by said stud $d$ and socket $f$, endwise perforated, having the endwise-movable collar P with the spurs $q$ at its one end portion, and also having the disk M with the aperture $m$ and ratchets, the hooks $n$ having detachable but non-rotatable, engagements, in the hubs of the pinions, and having the projections engaging said ratchets, draft connections between the screw-shaft K and said collar P, and means for preventing approaching movements of said collar in relation to the disk, substantially as described.

10. In a rawhide-twisting machine, the combination with the rotatable hooks, and means for turning them, of the other end support P for the strips, a shaft J removably mounted between end supports of the machine therefor and on which said part P is supported for an endwise tensioning movement, the screw-shaft K having a draft connection with the said support P, said screw-shaft journaled in the support therefor which is endwise adjustable, and means for confining such support in its adjusted positions, substantially as and for the purposes set forth.

11. In a machine for twisting strips of rawhide for whip-centers in plurality, simultaneously, substantially as described, the combination with a series of rotatable hooks mounted in circular arrangement, of a circular part P mounted endwise beyond and distant from said series of hooks in a line concentrically about which the hooks are arranged, and having members with which the ends of the rawhide strips opposite their hook-supported ends are engaged, means for individually rotating the hooks, and means for imparting a draft movement to said part P in a direction away from the hooks, substantially as described.

Signed by me at Springfield, Massachusetts, this 26th day of May, 1899.

JOHN P. DONOVAN.

Witnesses:
WM. S. BELLOWS,
M. A. CAMPBELL.